US011372884B2

(12) United States Patent
Kuroda et al.

(10) Patent No.: US 11,372,884 B2
(45) Date of Patent: Jun. 28, 2022

(54) INFORMATION PROCESSING SYSTEM, INFORMATION PROCESSING APPARATUS, INFORMATION PROCESSING METHOD, AND COMPUTER PROGRAM PRODUCT

(71) Applicant: KABUSHIKI KAISHA TOSHIBA, Minato-ku (JP)

(72) Inventors: Akira Kuroda, Yokohama (JP); Kouta Nakata, Shinagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 331 days.

(21) Appl. No.: 16/551,978

(22) Filed: Aug. 27, 2019

(65) Prior Publication Data

US 2020/0218728 A1 Jul. 9, 2020

(30) Foreign Application Priority Data

Jan. 7, 2019 (JP) .............................. JP2019-000775

(51) Int. Cl.
*G06F 17/00* (2019.01)
*G06F 16/25* (2019.01)
*G06N 20/00* (2019.01)

(52) U.S. Cl.
CPC ........... *G06F 16/258* (2019.01); *G06N 20/00* (2019.01)

(58) Field of Classification Search
CPC .............................. G06F 16/258; G06N 20/00
See application file for complete search history.

(56) References Cited

U.S. PATENT DOCUMENTS

| 10,650,020 B1* | 5/2020 | Mehta ..................... G06F 16/258 |
| 10,803,050 B1* | 10/2020 | Salkola ................. G10L 15/187 |
| 2010/0191760 A1* | 7/2010 | Kusumura ............. G06F 16/258 |
| | | 707/760 |
| 2016/0085982 A1 | 3/2016 | Guirguis et al. |
| 2019/0228084 A1* | 7/2019 | Ishii .................. G06F 16/24544 |

* cited by examiner

Primary Examiner — Greta L Robinson
(74) Attorney, Agent, or Firm — Oblon, McClelland, Maier & Neustadt, L.L.P.

(57) ABSTRACT

A first information processing apparatus includes a record set acquiring unit that acquires a record set, a record identification information acquiring unit that acquires record identification information, a concealing unit that generates a concealment record set from the record set using conversion information and generates concealment record identification information based on the record identification information and the conversion information, and a first transmitter that transmits the concealment record set and the concealment record identification information to a second information processing apparatus. The second information processing apparatus includes a second receiver that receives the concealment record set and the concealment record identification information from the first information processing apparatus and a data analyzer that analyzes each record in the concealment record set identified based on the concealment record identification information using a learning model or a numerical model.

10 Claims, 16 Drawing Sheets

FIG.5

CONVERSION INFORMATION

| ATTRIBUTE NAME | BEFORE CONVERSION | AFTER CONVERSION |
|---|---|---|
| Col0 | A | X |
| Col0 | B | Y |
| Col0 | C | Z |
| Col1 | aa | α |
| Col1 | ab | β |

51

| ATTRIBUTE NAME (BEFORE CONVERSION) | CONVERSION RULE |
|---|---|
| Col2 | NORMALIZATION (-1 TO 1) |
| Col3 | DOUBLE VALUE |

52

| ATTRIBUTE NAME (BEFORE CONVERSION) | ATTRIBUTE NAME (AFTER CONVERSION) |
|---|---|
| Col0 | AAA |
| Col1 | BBB |
| Col2 | CCC |
| Col3 | DDD |

| AAA | BBB | CCC | DDD | Col4 |
|---|---|---|---|---|
| X | α | 1 | 100 | P0 |
| X | β | -1 | 40 | P1 |
| Y | α | 0 | 20 | P2 |
| Y | β | -1 | 10 | P1 |
| Z | α | -1 | 0 | P2 |

| ATTRIBUTE NAME | BEFORE CONVERSION | AFTER CONVERSION |
|---|---|---|
| Col0 | A | X |
| Col0 | B | Y |
| Col0 | C | Z |
| Col1 | aa | α |
| Col1 | ab | β |

| ATTRIBUTE NAME (BEFORE CONVERSION) | CONVERSION RULE |
|---|---|
| Col2 | NORMALIZATION (-1 TO 1) |
| Col3 | DOUBLE VALUE |

| ATTRIBUTE NAME (BEFORE CONVERSION) | ATTRIBUTE NAME (AFTER CONVERSION) |
|---|---|
| Col0 | AAA |
| Col1 | BBB |
| Col2 | CCC |
| Col3 | DDD |

CONVERSION INFORMATION — TID: 1
CONVERSION INFORMATION — TID: 2
CONVERSION INFORMATION — TID: 3

FIG.14

| TID | RID |
|---|---|
| 1 | aaa |
| 2 | bbb |
| 3 | ccc |
| ⋮ | ⋮ |

FIG.20

CONVERSION INFORMATION (50)

51 —

| ATTRIBUTE NAME | BEFORE CONVERSION | AFTER CONVERSION |
|---|---|---|
| Col0 | A | X |
| Col0 | B | Y |
| Col0 | C | Z |
| Col1 | aa | α |
| Col1 | ab | β |

52 —

| ATTRIBUTE NAME | CONVERSION RULE |
|---|---|
| Col2 | NORMALIZATION (-1 TO 1) |
| Col3 | DOUBLE VALUE |

| Col0 | Col1 | Col2 | Col3 | Col4 |
|---|---|---|---|---|
| X | α | 1 | 100 | P0 |
| X | β | -1 | 40 | P1 |
| Y | α | 0 | 20 | P2 |
| Y | β | -1 | 10 | P1 |
| Z | α | -1 | 0 | P2 |

| Col0, Col1 |

| Col0 | Col1 | Col2 | Col3 | Col4 |
|------|------|------|------|------|
| A    | ac   | 100  | 50   | P0   |
| A    | ab   | 0    | 20   | P1   |
| D    | aa   | 50   | 5    | P2   |
| D    | ab   | 0    | 10   | P1   |
| E    | aa   | 50   | 0    | P2   |

CONVERSION INFORMATION (50)

51

| ATTRIBUTE NAME | BEFORE CONVERSION | AFTER CONVERSION |
|---|---|---|
| Col0 | A | X |
| Col0 | B | Y |
| Col0 | C | Z |
| Col0 | D | xx |
| Col0 | E | yy |
| Col1 | aa | α |
| Col1 | ab | β |
| Col1 | ac | γ |

52

| ATTRIBUTE NAME (BEFORE CONVERSION) | CONVERSION RULE |
|---|---|
| Col2 | NORMALIZATION (-1 TO 1) |
| Col3 | DOUBLE VALUE |

53

| ATTRIBUTE NAME (BEFORE CONVERSION) | ATTRIBUTE NAME (AFTER CONVERSION) |
|---|---|
| Col0 | AAA |
| Col1 | BBB |
| Col2 | CCC |
| Col3 | DDD |

US 11,372,884 B2

INFORMATION PROCESSING SYSTEM, INFORMATION PROCESSING APPARATUS, INFORMATION PROCESSING METHOD, AND COMPUTER PROGRAM PRODUCT

CROSS-REFERENCE TO RELATED APPLICATIONS

This application is based upon and claims the benefit of priority from Japanese Patent Application No. 2019-000775, filed on Jan. 7, 2019; the entire contents of which are incorporated herein by reference.

FIELD

Embodiments described herein relate generally to an information processing system, an information processing apparatus, an information processing method, and a computer program product.

BACKGROUND

Data analysis using a learning model and a numerical model generated through machine learning has been recently performed widely in a variety of fields. High expertise is required for tuning of an appropriate parameter and the like of the model used for data analysis; therefore, there are cases where the generation of a model is subcontracted to a third party. As such, cases are assumed that, to evaluate effectiveness of the model generated by the third party, an ordering party who subcontracts the generation of the model provides data of the same type as the data to be actually analyzed using the model to the third party and receives the analysis result. In such a case, when the actually-analyzed data using the model is, for example, confidential data such as manufacturing data, it is required that the data be provided to the third party in a state where the sensitive portions in the data are concealed.

However, in the state where the data to be analyzed using the model is concealed, the data cannot be appropriately analyzed in some cases. For example, when a set of confidential data such as manufacturing data accumulated as records (one example of a record set) is concealed and provided to the third party, because the third party cannot differentiate an individual record included in the concealed record set, the third party cannot perform appropriate data analysis using the model.

Patent Literature 1: U.S. Patent Publication No. 2016/0085982

BRIEF DESCRIPTION OF THE DRAWINGS

FIG. 5 is a drawing illustrating an example of conversion information;

FIG. 6 is a drawing illustrating an example of a concealment record set;

FIG. 13 is a drawing illustrating an example of the conversion information stored in a conversion information managing unit;

FIG. 14 is a drawing illustrating an example of an ID correspondence table;

FIG. 20 is a drawing illustrating an example of the conversion information;

FIG. 21 is a drawing illustrating an example of the concealment record set;

FIG. 22 is a drawing illustrating an example of the concealment record identification information;

FIG. 23 is a drawing illustrating an example of the record set;

DETAILED DESCRIPTION

According to one embodiment, an information processing system includes a first information processing apparatus and a second information processing apparatus.

The first information processing apparatus includes a record set acquiring unit, a record identification information acquiring unit, a concealing unit, and a first transmitter. The record set acquiring unit is configured to acquire a record set. The record set is a set of records having a plurality of data elements as pairs of attribute names and attribute values. The record identification information acquiring unit is configured to acquire record identification information. The record identification information is information for uniquely identifying each record included in the record set. The record identification information indicates at least one of the attribute names. The concealing unit is configured to convert at least one of an attribute name and an attribute value of a data element designated with conversion information among the plurality of data elements held by at least one record included in the record set, in accordance with the conversion information to generate a concealment record set. The concealing unit is further configured to generate concealment record identification information for uniquely identifying each record included in the concealment record set based on the record identification information and the conversion information. The first transmitter is configured to transmit the concealment record set and the concealment record identification information to the second information processing apparatus.

The second information processing apparatus includes a second receiver and a data analyzer. The second receiver is configured to receive the concealment record set and the concealment record identification information from the first information processing apparatus. The data analyzer is configured to analyze, by using a learning model or a numerical model, each record included in the concealment record set and identified based on the concealment record identification information.

The following describes an information processing system, an information processing apparatus, an information processing method, and a program according to embodiments in detail with reference to the attached drawings.

First Embodiment

Figure 1:
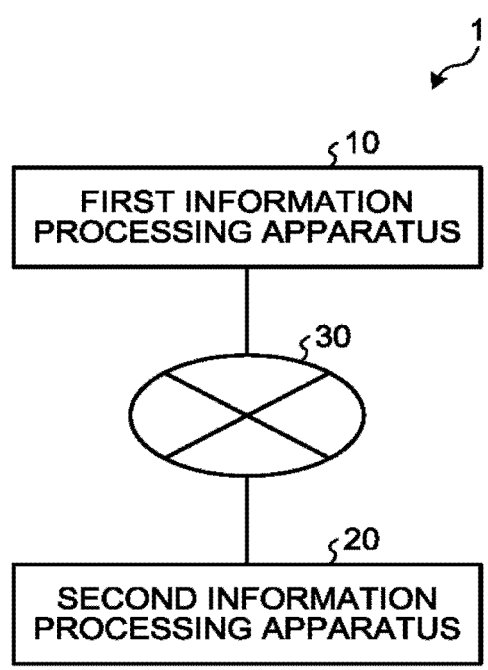
FIG. 1 is a drawing illustrating a schematic configuration of an information processing system.

FIG. 1 illustrates a schematic configuration of an information processing system 1 according to the embodiment. As illustrated in FIG. 1, this information processing system 1 has a configuration in which a first information processing apparatus 10 and a second information processing apparatus 20 are coupled over a network 30 such as the Internet. The first information processing apparatus 10 is an information processing apparatus used by a data provider and the second information processing apparatus 20 is an information processing apparatus used by a data user.

To evaluate effectiveness of a model generated by the data user, the data provider provides data desired to be analyzed using the model to the data user. The data user analyzes the data provided from the data provider using the model and returns the analysis result to the data provider. The data provider confirms the analysis result received from the data user and thus can evaluate effectiveness of the model.

In this embodiment, it is assumed that the data provided from the data provider to the data user is, for example, confidential data such as manufacturing data and especially a set of data accumulated as records (record set). In this case, the record set needs to be provided to the data user in a concealed state and analyzed in the concealed state using the model. At this time, when the records included in the record set cannot be discriminated due to the concealment, the analysis using the model cannot be appropriately performed. The information processing system 1 of this embodiment is configured to solve the problem and ensure appropriately analyzing the respective records included in the concealed record set using the model.

Figure 2:
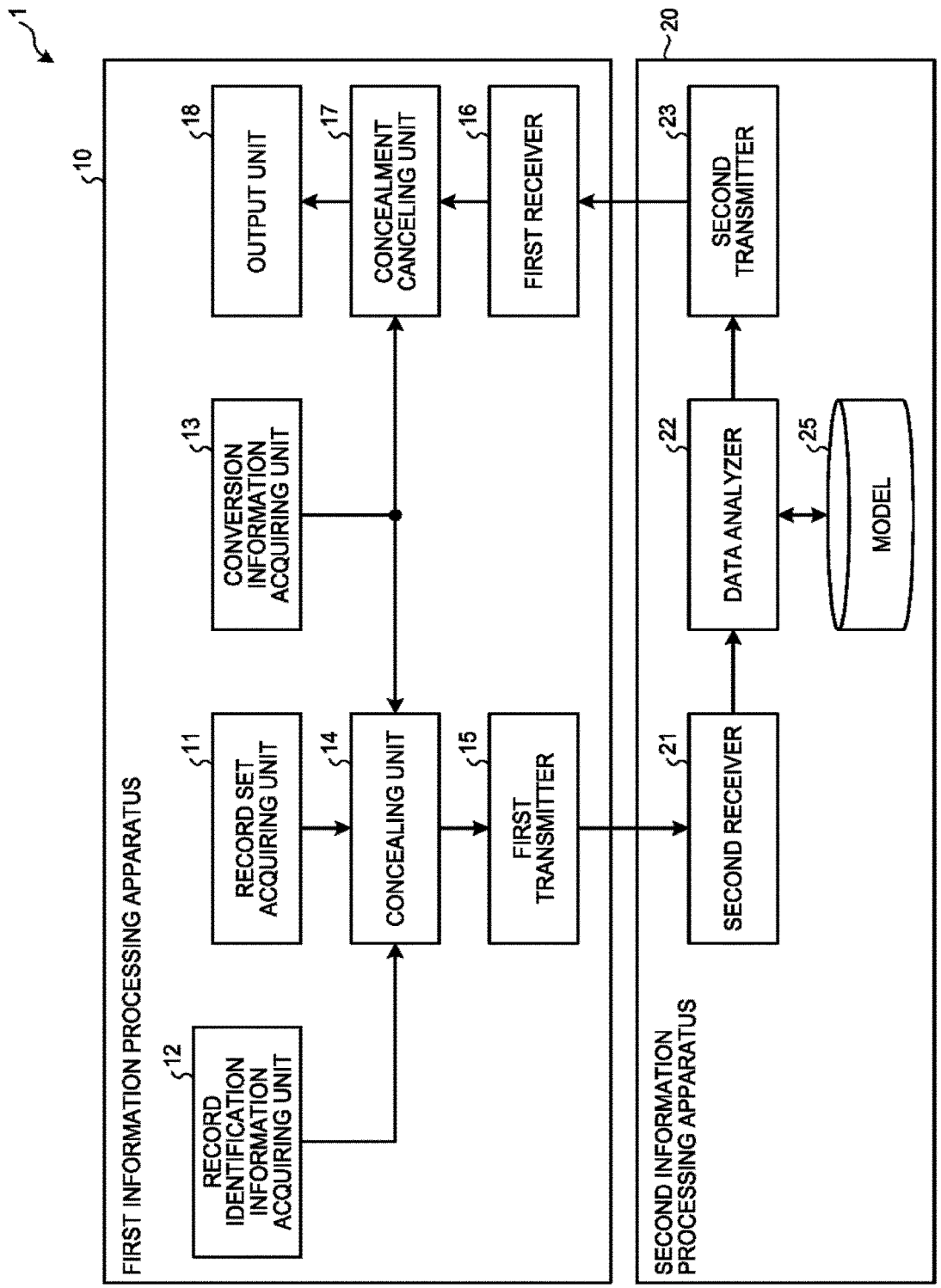
FIG. 2 is a block diagram illustrating an example of a functional configuration of the information processing system according to a first embodiment.

FIG. 2 is a block diagram illustrating an example of a functional configuration of the information processing system 1 according to the first embodiment. As illustrated in FIG. 2, the first information processing apparatus 10 includes a record set acquiring unit 11, a record identification information acquiring unit 12, a conversion information acquiring unit 13, a concealing unit 14, a first transmitter 15, a first receiver 16, a concealment canceling unit 17, and an output unit 18. As illustrated in FIG. 2, the second information processing apparatus 20 includes a second receiver 21, a data analyzer 22, and a second transmitter 23.

The record set acquiring unit 11 acquires the record set. The record set is a set of records having a plurality of data elements, which are pairs of attribute names and attribute values. The respective records included in the record set have common data elements as data elements common in the attribute name. Each record is uniquely identifiable based on at least one attribute value among the common data elements.

Figure 3:
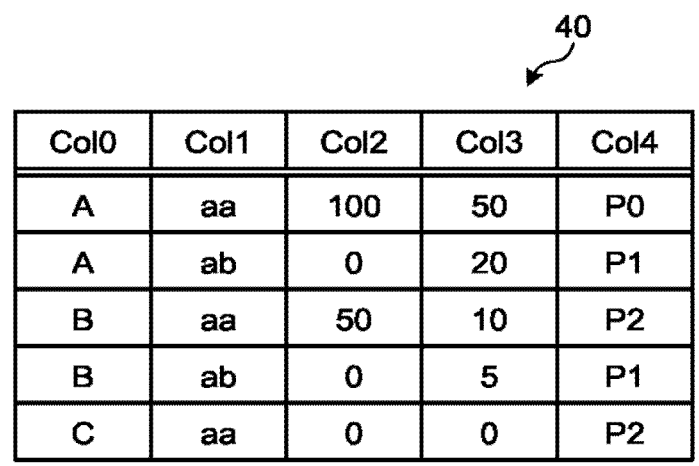
FIG. 3 is a drawing illustrating an example of a record set.

FIG. 3 illustrates an example of the record set. A record set 40 illustrated in FIG. 3 is an example of the record set in table format including the five records. When the data elements of the respective records included in this record set 40 are expressed by (attribute name/attribute value), for example, the records in the first line have (Col0/A), (Col1/aa), (Col2/100), (Col3/50), and (Col4/P0) as the data elements. The records in the second line have (Col0/A), (Col1/ab), (Col2/0), (Col3/20), and (Col4/P0) as the data elements.

In the record set 40 illustrated in FIG. 3, all data elements of the respective records are the common data elements. Among them, combinations of attribute values of the common data elements with the attribute name Col0 and the attribute values of the common data elements with the attribute name Col1 ensure unique identification of the respective records included in the record set 40. Although the record set 40 in the table format is described as the example here, the record set 40 only needs to be the set of the records meeting the above-described conditions, and is not limited to the record set 40 in the table format as illustrated in FIG. 3.

The record identification information acquiring unit 12 acquires the record identification information. The record identification information is information to identify each record included in the record set 40 and information indicative of the attribute name of at least one common data element.

Figure 4:
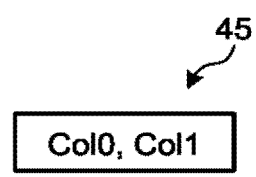
FIG. 4 is a drawing illustrating an example of record identification information.

FIG. 4 illustrates an example of the record identification information. Record identification information 45 illustrated in FIG. 4 is an example of the record identification information corresponding to the record set 40 illustrated in FIG. 3 and indicates attribute names Col0 and Col1 of the two common data elements where the respective records are identifiable by the combinations of the attribute values.

The conversion information acquiring unit 13 acquires the conversion information. The conversion information is information designating a data element target for conversion among the data elements of the respective records included in the record set 40 and a method for the conversion.

FIG. 5 illustrates an example of the conversion information. Conversion information 50 illustrated in FIG. 5 is an example of the conversion information applied to the record set 40 illustrated in FIG. 3 and includes a first attribute value conversion table 51, a second attribute value conversion table 52, and an attribute name conversion table 53. The first attribute value conversion table 51 is a conversion table used for conversion of the attribute value expressed by a character string into another character string that defines the attribute name of the data element target for conversion and the character strings before and after the conversion. The second attribute value conversion table 52 is a conversion table used for conversion of the attribute value expressed by a value while maintaining statistic information that defines the attribute name of the data element target for conversion and a conversion rule applied to the attribute value. The attribute name conversion table 53 is a conversion table used for conversion of the attribute name that defines the attribute name of the data element target for conversion and the character string after the conversion.

Although the conversion information 50 illustrated in FIG. 5 includes the first attribute value conversion table 51 and the second attribute value conversion table 52 for conversion of the attribute value and the attribute name conversion table 53 for conversion of the attribute name, the conversion information 50 may include any one of the first attribute value conversion table 51 and the second attribute value conversion table 52 for conversion of the attribute value and the attribute name conversion table 53 for conversion of the attribute name. Obviously, in a case where the conversion information 50 that includes only the first attribute value conversion table 51 and the second attribute value conversion table 52 for conversion of the attribute value is applied to the record set 40, only the attribute values of the respective records included in the record set 40 are converted, and in a case where the conversion information 50 that includes only the attribute name conversion table 53 for conversion of the attribute name is applied to the record set 40, only the attribute names of the respective records included in the record set 40 are converted. The attribute name or the attribute value of the data element target for conversion designated in the conversion information 50 is selected according to a degree of secrecy of the data elements of the respective records included in the record set 40.

The concealing unit 14 applies the conversion information 50 acquired by the conversion information acquiring unit 13 to the record set 40 acquired by the record set acquiring unit 11, and converts at least one of the attribute name and the attribute value of the data element designated by the conversion information 50 among the plurality of data elements that the respective records included in the record set 40 have in accordance with the conversion information 50 to generate a concealment record set.

FIG. 6 illustrates an example of the concealment record set. A concealment record set 60 illustrated in FIG. 6 is an example of the concealment record set generated by applying the conversion information 50 illustrated in FIG. 5 to the record set 40 illustrated in FIG. 3. It can be seen from these drawings that, among the plurality of data elements that the respective records included in the record set 40 illustrated in FIG. 3 have, the conversion of the attribute names and the attribute values of the data elements designated with the conversion information 50 illustrated in FIG. 5 in accordance with the conversion information 50 generates the concealment record set 60 illustrated in FIG. 6. Among the data elements of the respective records included in the record set 40 illustrated in FIG. 3, the attribute name and the attribute values of the data elements with the attribute name Col4 are not designated as the target for conversion in the conversion information 50 illustrated in FIG. 5 and therefore the data elements are not converted. Thus, the respective records included in the concealment record set 60 may include the unconverted data elements, that is, the data elements having values identical to the respective records included in the record set 40.

The concealing unit 14 generates concealment record identification information to identify the respective records included in the concealment record set 60 based on the record identification information 45 acquired by the record identification information acquiring unit 12 and the conversion information 50 acquired by the conversion information acquiring unit 13. That is, in a case where the attribute name of the common data element indicated by the record identification information 45 is the target for conversion in the conversion information 50, that is, the attribute name conversion table 53 includes the attribute name of the common data element indicated by the record identification information 45, the concealing unit 14 converts the attribute name in accordance with the attribute name conversion table 53 to generate the concealment record identification information. Meanwhile, when the attribute name of the common data element indicated by the record identification information 45 is not the target for conversion in the conversion information 50, the concealing unit 14 copies the record identification information 45 acquired by the record identification information acquiring unit 12 as it is and treats it as the concealment record identification information.

Figure 7:
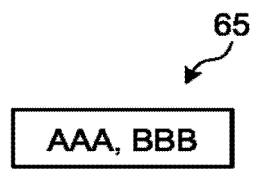
FIG. 7 is a drawing illustrating an example of concealment record identification information.

FIG. 7 illustrates one example of the concealment record identification information. Concealment record identification information 65 illustrated in FIG. 7 is an example of the concealment record identification information 65 generated based on the record identification information 45 illustrated in FIG. 4 and the conversion information 50 illustrated in FIG. 5. The two attribute names Col0 and coil indicated by the record identification information 45 illustrated in FIG. 4 are the targets for conversion in the conversion information 50 illustrated in FIG. 5; therefore, converting the two attribute names Col0 and col1 into AAA and BBB in accordance with the attribute name conversion table 53 in this conversion information 50 generates the concealment record identification information 65 illustrated in FIG. 7.

The first transmitter 15 transmits the concealment record set 60 and the concealment record identification information 65 generated by the concealing unit 14 to the second information processing apparatus 20 over the network 30.

The second receiver 21 in the second information processing apparatus 20 receives the concealment record set 60 and the concealment record identification information 65 transmitted by the first transmitter 15 in the first information processing apparatus 10 over the network 30.

The data analyzer 22 analyzes the respective records included in the concealment record set 60 received by the second receiver 21 and the respective records identified based on the concealment record identification information 65 received by the second receiver 21 using a model 25. In this embodiment, it is assumed that the model 25 used for the analysis by the data analyzer 22 is a model generated by the data user side in response to a request from the data provider as described above. This model 25 may be, for example, a learning model such as Deep Neural Network (DNN) generated through learning such as deep learning or may be a numerical model for a process based on a numerical algorithm such as regression analysis.

For example, to analyze the respective records included in the concealment record set 60 described in FIG. 6 as the example, the data analyzer 22 first identifies the individual records based on the concealment record identification information 65 illustrated in FIG. 7. That is, the two converted unique data with the attribute names AAA and BBB indicated by the concealment record identification information 65 are treated as one record. When the data analyzer 22 classifies these records using, for example, the learning model that, for example, classifies the records into two classes by whether a value of CCC is 0 or more or less than 0, the five records included in the concealment record set 60 are classified into the two classes using this learning model.

For example, in a prediction of a value using the numerical model by least square method, the data analyzer 22, for example, assumes an objective variable Y as CCC and an explanatory variable X as DDD and determines a and b such that a value of $\Sigma(Y_i = aX_i + b)^2$, namely, a sum of squares of errors becomes the minimum. Here, $Y_i$ and $X_i$ when i=1 to 5 are set to $Y_i$ [1, −1, 0, −1, −1], $X_i$ [100, 40, 20, 10, 0] in order.

Here, assume the case where the concealment record identification information corresponding to the concealment record set 60 described in FIG. 6 as the example indicates only the attribute name AAA, since the concealment record set 60 includes the two X and Y records each having the attribute name AAA, the individual records cannot be identified. Accordingly, which should be employed as the values of CCC and DDD in the above-described example is unknown, failing to appropriately classify and analyze the data using the model 25. In contrast to this, this embodiment can identify the individual records included in the concealment record set 60 based on the concealment record identification information 65 and therefore can appropriately classify and analyze the data using the model 25.

In addition to the use for analysis for evaluation of the performance of the model 25, the concealment record set 60 received by the second receiver 21 is usable for evaluation to select an optimal model among the some models 25 and usable for tuning a parameter again (used as learning data for the learning model).

Figure 8:
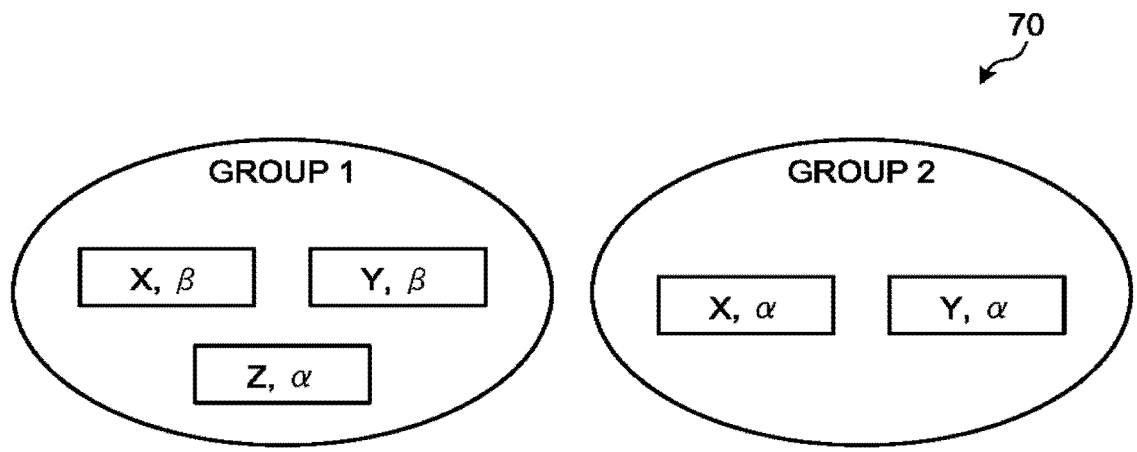
FIG. 8 is a drawing illustrating an example of an analysis result.

FIG. 8 illustrates an example of the analysis result by the data analyzer 22. An analysis result 70 illustrated in FIG. 8 indicates a result of classifying the respective records included in the concealment record set 60 illustrated in FIG. 6 into the two groups using the model 25. This analysis result 70 indicates that, among the records included in the concealment record set 60 illustrated in FIG. 6, in combinations of the two attribute values corresponding to the two attribute names AAA and BBB indicated by the concealment record identification information 65 illustrated in FIG. 7, the record of "X, β", the record of "Y, β", and the record of "Z, α" are classified as "group 1" and the record of "X, α" and the record of "Y, α" are classified as "group 2".

The second transmitter 23 transmits the analysis result 70 by the data analyzer 22 to the first information processing apparatus 10 over the network 30.

The first receiver 16 in the first information processing apparatus 10 receives the analysis result 70 by the data analyzer 22 transmitted from the second transmitter 23 in the second information processing apparatus 20 over the network 30.

The concealment canceling unit 17 performs inverse transformation on the analysis result 70 received by the first receiver 16 based on the conversion information 50 used to conceal the record set 40 to generate a concealment cancellation analysis result. The concealment cancellation analysis result is a restoration of the respective records indicated by the analysis result 70 by the data analyzer 22 in a state identifiable by the record identification information 45. The concealment canceling unit 17 performs the inverse transformation on the attribute values used to identify the respective records in the analysis result 70, that is, the attribute values corresponding to the attribute names indicated by the concealment record identification information 65 based on the conversion information 50 to generate the concealment cancellation analysis result where the concealment of the respective records in the analysis result 70 is released.

Figure 9:
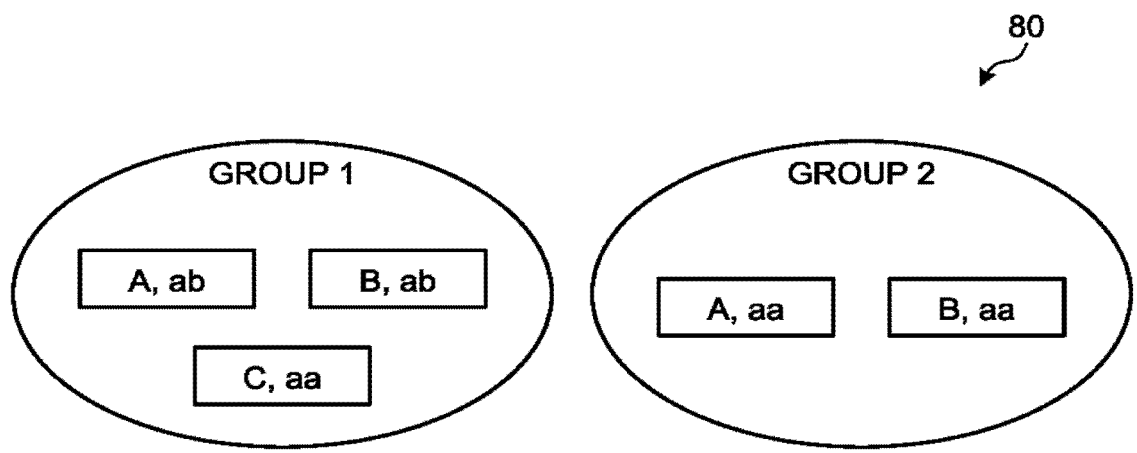
FIG. 9 is a drawing illustrating an example of a concealment cancellation analysis result.

FIG. 9 illustrates an example of the concealment cancellation analysis result. A concealment cancellation analysis result 80 illustrated in FIG. 9 is an example of the concealment cancellation analysis result generated by the inverse transformation on the analysis result 70 illustrated in FIG. 8 based on the conversion information 50 illustrated in FIG. 5. It can be seen from this concealment cancellation analysis result 80 that, when the respective records included in the record set 40 illustrated in FIG. 3 are classified into two groups using the model 25, among the combinations of the two attribute values corresponding to the two attribute names Col0 and Col1 indicated by the record identification information 45, the record of "A, ab", the record of "B, ab", and the record of "C, aa" are classified as "group 1" and the record of "A, aa" and the record of "B, aa" are classified as "group 2". That is, it can be seen that, among the respective records included in the record set 40 illustrated in FIG. 3, the records in the second line having (Col0/A) and (Col1/ab) as the data elements, the records in the fourth line having (Col0/B) and (Col1/ab) as the data elements, and the records in the fifth line having (Col0/C) and (Col1/aa) as the data elements are classified as "group 1" and the records in the first line having (Col0/A) and (Col1/aa) as the data elements and the records in the third line having (Col0/B) and (Col1/aa) as the data elements are classified as "group 2".

The output unit 18 outputs the concealment cancellation analysis result 80 generated by the concealment canceling unit 17 such that the data provider can confirm the concealment cancellation analysis result 80. The output of the concealment cancellation analysis result 80 by the output unit 18 may be a configuration where, for example, a display displays the concealment cancellation analysis result 80 or may be a configuration other than the display, such as printing to a paper medium. The data provider confirms the concealment cancellation analysis result 80 output by the output unit 18. This allows evaluation of effectiveness of the model 25 generated by the data user and used for data analysis.

Figure 10:
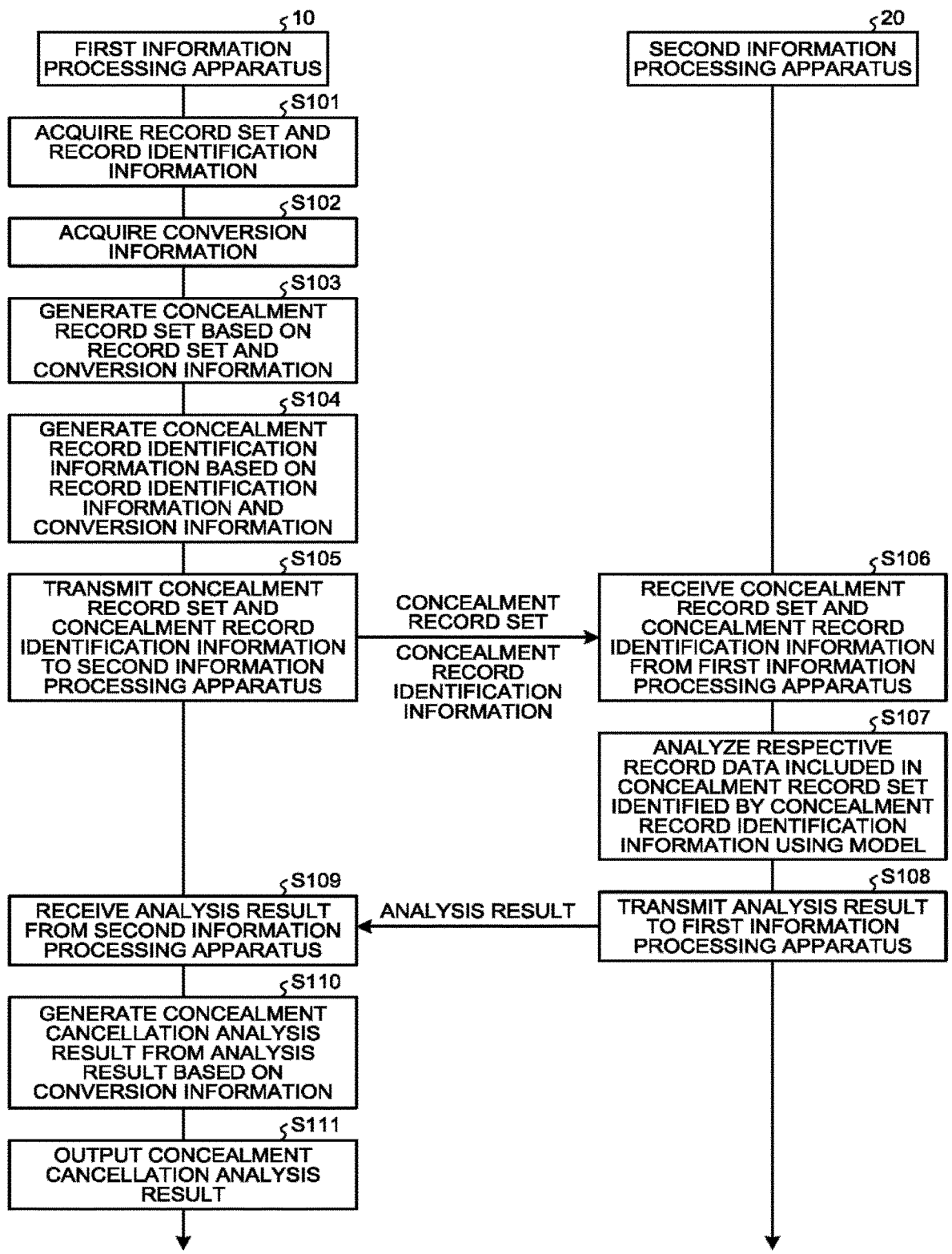
FIG. 10 is a sequence diagram illustrating an example of a process procedure of the information processing system according to the first embodiment.

Next, the following describes a flow of a sequence of processes performed in this embodiment with reference to FIG. 10. FIG. 10 is a sequence diagram illustrating an example of a process procedure of the information processing system 1 according to the first embodiment.

First, in the first information processing apparatus 10, the record set acquiring unit 11 acquires the record set 40 and the record identification information acquiring unit 12 acquires the record identification information 45 (Step S101). The conversion information acquiring unit 13 acquires the conversion information 50 (Step S102). Then, the concealing unit 14 generates the concealment record set 60 based on the record set 40 and the conversion information 50 (Step S103) and generates the concealment record identification information 65 based on the record identification information 45 and the conversion information 50 (Step S104). The first transmitter 15 transmits the concealment record set 60 and the concealment record identification information 65 generated by the concealing unit 14 to the second information processing apparatus 20 (Step S105).

Next, in the second information processing apparatus 20, the second receiver 21 receives the concealment record set 60 and the concealment record identification information 65 from the first information processing apparatus 10 (Step S106). Then, the data analyzer 22 analyzes the respective record data included in the concealment record set 60 identified by the concealment record identification information 65 using the model 25 (Step S107). The second transmitter 23 transmits the analysis result 70 by the data analyzer 22 to the first information processing apparatus 10 (Step S108).

Next, in the first information processing apparatus 10, the first receiver 16 receives the analysis result 70 by the data analyzer 22 from the second information processing apparatus 20 (Step S109). Then, the concealment canceling unit 17 generates the concealment cancellation analysis result 80 from the analysis result 70 by the data analyzer 22 based on the conversion information 50 (Step S110). The output unit 18 outputs (for example, displayed in a display) the concealment cancellation analysis result 80 generated by the concealment canceling unit 17 (Step S111).

As described above in detail with the specific examples, according to this embodiment, the first information processing apparatus 10 transmits the concealment record identification information 65 to identify the respective records included in the concealment record set 60 together with the concealment record set 60, which conceals the record set 40, to the second information processing apparatus 20. Accordingly, the second information processing apparatus 20 can identify the respective records included in the concealment record set 60 based on the concealment record identification information 65 and can appropriately analyze the respective records included in the concealment record set 60 using the model 25 while reducing a risk of an information leakage by concealment.

In this embodiment, the second information processing apparatus 20 transmits the analysis result 70 to the first information processing apparatus 10, and the first information processing apparatus 10 generates and outputs the concealment cancellation analysis result 80. Accordingly, the data provider confirms the concealment cancellation analysis result 80 to ensure evaluating the effectiveness of the model 25 generated by the data user.

Second Embodiment

Next, the following describes the second embodiment. This embodiment is an example that the first information processing apparatus 10 has a function of generating the conversion information 50 and a function of managing the conversion information 50. Other than that, the embodiment is similar to the above-described first embodiment. In the following description, same reference numerals are given to components common to the first embodiment, and the overlapping description will be appropriately omitted.

Figure 11:
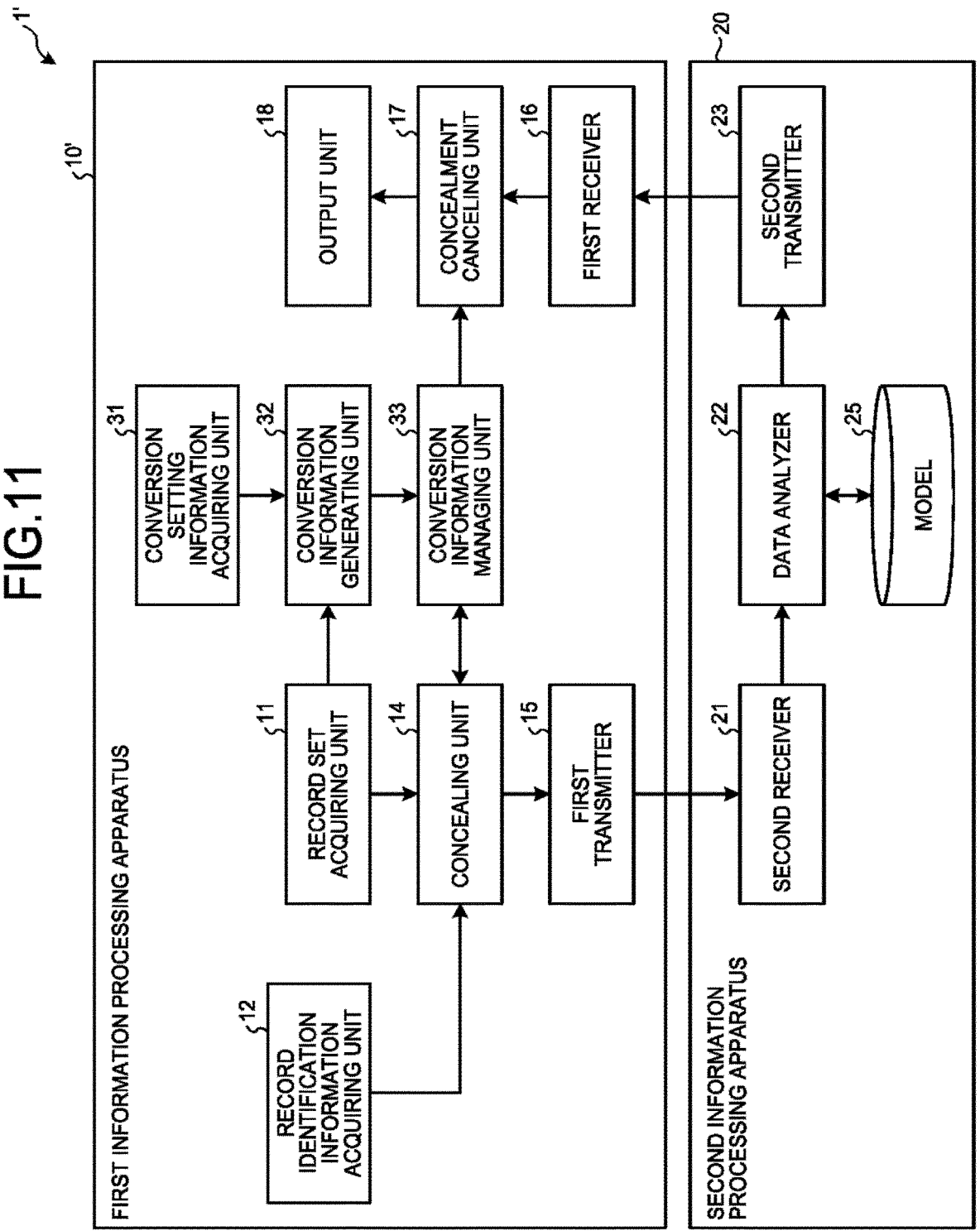
FIG. 11 is a block diagram illustrating an example of a functional configuration of an information processing system according to a second embodiment.

FIG. 11 is a block diagram illustrating an example of a functional configuration of an information processing system 1' according to the second embodiment. As illustrated in FIG. 11, a first information processing apparatus 10' of this embodiment includes a conversion setting information acquiring unit 31 and a conversion information generating unit 32, instead of the conversion information acquiring unit 13 that the above-described first information processing apparatus 10 according to the first embodiment includes. The first information processing apparatus 10' of this embodiment includes a conversion information managing unit 33 to manage the conversion information 50.

The conversion setting information acquiring unit 31 acquires conversion setting information. The conversion setting information is information that designates a conversion rule applied to the attribute name or the attribute value target for conversion.

Figure 12:
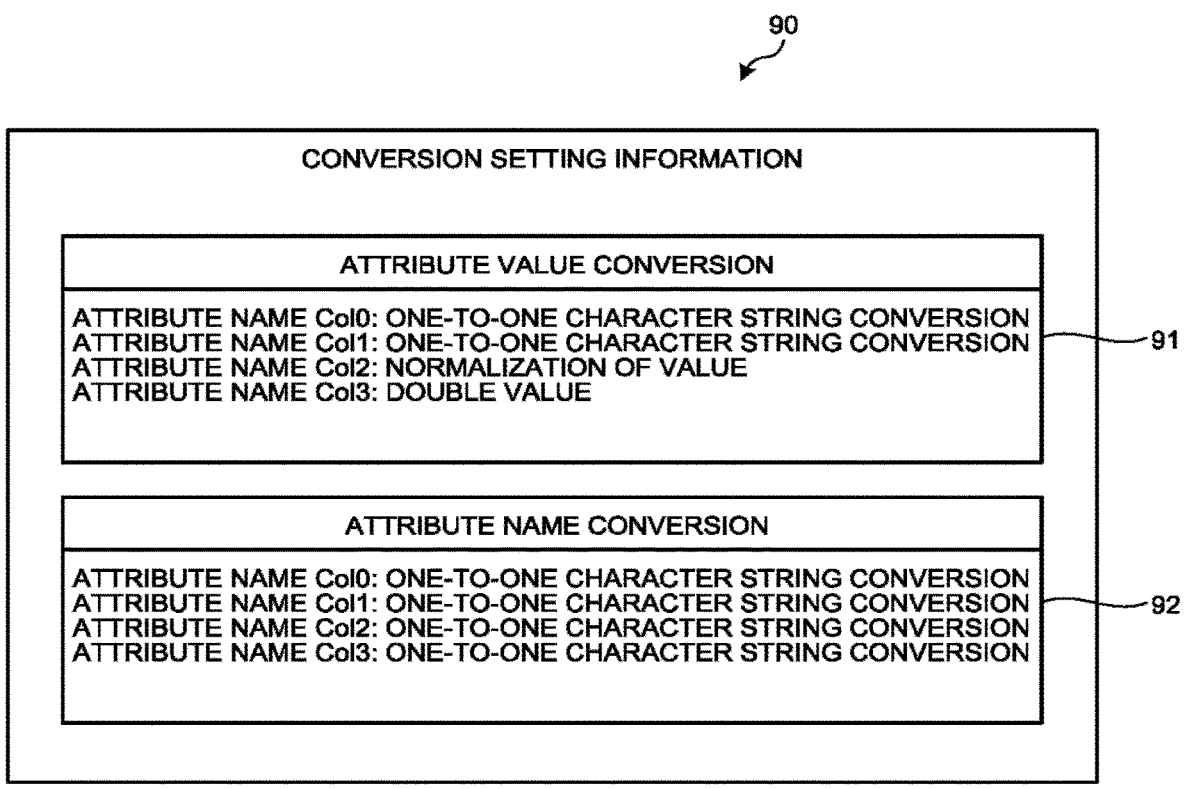
FIG. 12 is a drawing illustrating an example of conversion setting information.

FIG. 12 illustrates an example of the conversion setting information. Conversion setting information 90 illustrated in FIG. 12 is an example of the conversion setting information when both of the attribute names and the attribute values of the data elements of the respective records included in the record set 40 are targets for conversion and includes an attribute value conversion rule 91 applied to the conversion of the attribute value and an attribute name conversion rule 92 applied to the conversion of the attribute name. The attribute value conversion rule 91 designates the data element target for conversion by the attribute name and designates a method (conversion rule) that converts the attribute value of the data element. The attribute name conversion rule 92 designates the attribute name of the data element target for conversion and a method (conversion rule) that converts the attribute name. While in the conversion setting information 90 illustrated in FIG. 12 as the example, conversion rules such as "one-to-one character string conversion" as a conversion rule of the character string and "normalization of value" and "double value" are designated as conversion rules of the value, the conversion rule applied to the conversion is not limited to these rules. For example, like conversion of "P0" into "X0", a conversion rule designating specific character strings before and after the conversion may be designated.

The conversion information generating unit 32 generates the conversion information 50 based on the record set 40 acquired by the record set acquiring unit 11 and the conversion setting information 90 acquired by the conversion setting information acquiring unit 31. For example, the conversion information generating unit 32 can generate the conversion information 50 illustrated in FIG. 5 based on the record set 40 illustrated in FIG. 3 and the conversion setting information 90 illustrated in FIG. 12. That is, among the data elements of the respective records included in the record set 40 illustrated in FIG. 3, respective character strings after conversion of the attribute names and the attribute values to which "one-to-one character string conversion" is applied are determined, thus generating the conversion information 50 illustrated in FIG. 5.

The conversion information managing unit 33 manages the conversion information 50 generated by the conversion information generating unit 32. That is, as illustrated in FIG. 13, TID, a unique ID (second identification information) identifying the conversion information 50 is given to the conversion information 50 generated by the conversion information generating unit 32 and the conversion information 50 is stored in the conversion information managing unit 33. In this embodiment, when the concealing unit 14 generates the concealment record set 60 using the conversion information 50 stored in the conversion information managing unit 33, RID, a unique ID (first identification information) identifying the concealment record set 60 is given to the concealment record set 60. For example, as illustrated in FIG. 14, the conversion information managing unit 33 holds a correspondence table 95 where RID given to the concealment record set 60 is associated with TID given to the conversion information 50 used to generate the concealment record set 60.

In this embodiment, when the first information processing apparatus 10' transmits the concealment record set 60 to the second information processing apparatus 20, the concealment record set 60 is transmitted such that the concealment record set 60 analyzed by the data analyzer 22 in the second information processing apparatus 20 is identifiable with RID, for example, RID is given to the concealment record set 60. When the second information processing apparatus 20 transmits the analysis result 70 by the data analyzer 22 to the first information processing apparatus 10', the analysis result 70 is transmitted such that the concealment record set 60 corresponding to the analysis result 70, that is, the concealment record set 60 analyzed by the data analyzer 22 using the model 25 is identifiable with RID, for example, RID is given to the analysis result 70.

In this embodiment, when the concealment canceling unit 17 in the first information processing apparatus 10' generates the concealment cancellation analysis result 80 from the analysis result 70 by the data analyzer 22 in the second information processing apparatus 20, the conversion information 50 used for inverse transformation on the analysis result 70 is identified based on RID of the concealment record set 60 corresponding to the analysis result 70 and the correspondence table 95 stored in the conversion information managing unit 33. That is, the concealment canceling unit 17 refers to the correspondence table 95 held by the conversion information managing unit 33 to identify TID associated with RID of the concealment record set 60 corresponding to the analysis result 70 received by the first receiver 16 from the second information processing apparatus 20. Among the conversion information 50 stored in the conversion information managing unit 33, performing the inverse transformation on the analysis result 70 using the conversion information 50 to which this TID is given generates the concealment cancellation analysis result 80.

While the above-described first information processing apparatus 10 of the first embodiment has been described not including the conversion information managing unit 33, the above-described first information processing apparatus 10 of the first embodiment may include the conversion information managing unit 33. In this case, the conversion information managing unit 33 adds TID to the conversion information 50 acquired by the conversion information acquiring unit 13 and stores the conversion information 50 and holds the above-described correspondence table 95, thus managing the conversion information 50 acquired by the conversion information acquiring unit 13.

Figure 15:
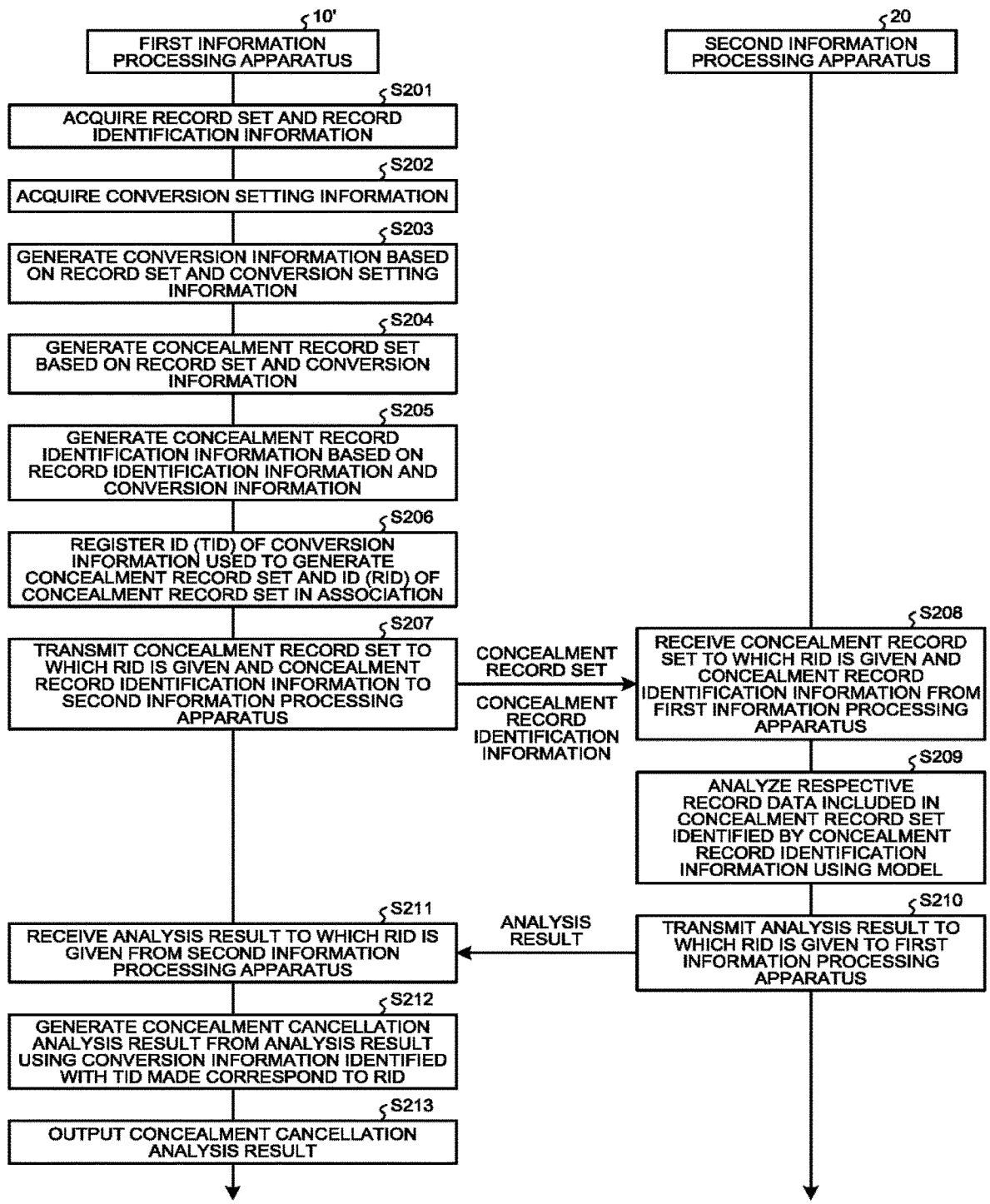
FIG. 15 is a sequence diagram illustrating an example of a process procedure of the information processing system according to the second embodiment.

Next, the following describes a flow of a sequence of processes performed in this embodiment with reference to FIG. 15. FIG. 15 is a sequence diagram illustrating an example of a process procedure of the information processing system 1' according to the second embodiment.

First, in the first information processing apparatus 10', the record set acquiring unit 11 acquires the record set 40 and the record identification information acquiring unit 12 acquires the record identification information 45 (Step S201). The conversion setting information acquiring unit 31 acquires the conversion setting information 90 (Step S202). The conversion information generating unit 32 generates the conversion information 50 based on the record set 40 and the conversion setting information 90 (Step S203). TID is given to the conversion information 50 generated by the conversion information generating unit 32, and the conversion information 50 is stored in the conversion information managing unit 33.

Afterwards, the concealing unit 14 reads the conversion information 50 from the conversion information managing unit 33 and generates the concealment record set 60 based on the record set 40 and the conversion information 50 (Step S204), and generates the concealment record identification information 65 based on the record identification information 45 and the conversion information 50 (Step S205). RID is given to the concealment record set 60 generated by the concealing unit 14. Then, the concealing unit 14 registers, in association each other, TID of the conversion information 50 used to generate the concealment record set 60 and RID of the generated concealment record set 60 in the correspondence table 95 held by the conversion information managing unit 33 (Step S206). The first transmitter 15 transmits the concealment record set 60 to which RID is given and the concealment record identification information 65 generated by the concealing unit 14 to the second information processing apparatus 20 (Step S207).

Next, in the second information processing apparatus 20, the second receiver 21 receives the concealment record set 60 to which RID is given and the concealment record identification information 65 from the first information processing apparatus 10 (Step S208). The data analyzer 22 analyzes the respective record data included in the concealment record set 60 identified by the concealment record identification information 65 using the model 25 (Step S209). The second transmitter 23 transmits the analysis result 70 by the data analyzer 22 to which RID of the concealment record set 60 analyzed using the model 25 is given to the first information processing apparatus 10 (Step S210).

Next, in the first information processing apparatus 10, the first receiver 16 receives the analysis result 70 to which RID is given from the second information processing apparatus 20 (Step S211). Then, the concealment canceling unit 17 refers to the correspondence table 95 held by the conversion information managing unit 33 to identify the conversion information 50 identified with TID associated with RID given to the analysis result 70 and generates the concealment cancellation analysis result 80 from the analysis result 70 by the data analyzer 22 using this conversion information 50 (Step S212). The output unit 18 outputs (for example, displayed in the display) the concealment cancellation analysis result 80 generated by the concealment canceling unit 17 (Step S213).

As described in detail with the specific examples, according to this embodiment, the first information processing apparatus 10' acquires the conversion setting information 90 instead of the conversion information 50 and generates the conversion information 50 based on this conversion setting information 90 and the record set 40; therefore, in addition to obtaining the effects similar to the above-described first embodiment, an effect that the conversion information 50 optimal to conceal the record set 40 can be flexibly generated is obtained.

In this embodiment, the conversion information managing unit 33 in the first information processing apparatus 10' gives TID to the conversion information 50 and stores the conversion information 50, and holds the correspondence table 95 in which RID given to the concealment record set 60 is associated with TID given to the conversion information 50 used to generate this concealment record set 60. Using this correspondence table 95, the conversion information 50 necessary to generate the concealment cancellation analysis result 80 from the analysis result 70 by the data analyzer 22 in the second information processing apparatus 20 is identifiable. Accordingly, with this embodiment, even when a large number of pieces of the conversion information are treated in the first information processing apparatus 10', the first information processing apparatus 10' can appropriately manage these pieces of conversion information 50 and an operation error caused by the use of the incorrect conversion information 50 can be prevented beforehand.

Modification 1

While the above-described embodiments assume the conversion by the concealing unit 14 targeting all records included in the record set 40, there may be records not converted by the concealing unit 14. However, even when the records not converted by the concealing unit 14 are present, the respective records included in the concealment record set 60 need to be uniquely identified based on the concealment record identification information 65. In view of this, it is necessary that the attribute name and the value of the attribute value after conversion converted by the concealing unit 14 do not match the attribute name and the attribute value of the record not the target for conversion by the concealing unit 14.

For example, in a case where the records in the fifth line are not the target for conversion among the records included in the record set described as the example in FIG. 3, the values after conversion of the attribute values of Col0 need to be values different from C and the values after conversion of the attribute values of Col1 need to be values different from aa.

Modification 2

While the above-described embodiments have been described assuming the case where the first information processing apparatus 10 (10') generates the one pair of the concealment record set 60 and the concealment record identification information 65, in a case where a plurality of pairs of the concealment record sets 60 and pieces of the concealment record identification information 65 are generated, methods of using the conversion information 50 and the conversion setting information 90 include some possible variations.

For example, the plurality pieces of conversion information 50 are generated based on the one conversion setting information 90 and the one record set 40 and the plurality pieces of conversion information 50 are individually applied to the one record set 40 and the record identification information 45 to allow generating the plurality of concealment record sets 60 and the concealment record identification information 65.

Giving a specific example, for example, assume that the record set 40 illustrated in FIG. 3, the record identification information 45 illustrated in FIG. 4, and the conversion setting information 90 illustrated in FIG. 12 are acquired. In this case, as described in the above-described embodiment, the conversion information 50 illustrated in FIG. 5 is generated based on the conversion setting information 90 illustrated in FIG. 12 and the record set 40 illustrated in FIG. 3. The application of the conversion information 50 illustrated in FIG. 5 to the record set 40 illustrated in FIG. 3 generates the concealment record set 60 illustrated in FIG. 6, and the application of the conversion information 50 illustrated in FIG. 5 to the record identification information 45 illustrated in FIG. 4 generates the concealment record identification information 65 illustrated in FIG. 7.

Figure 16:
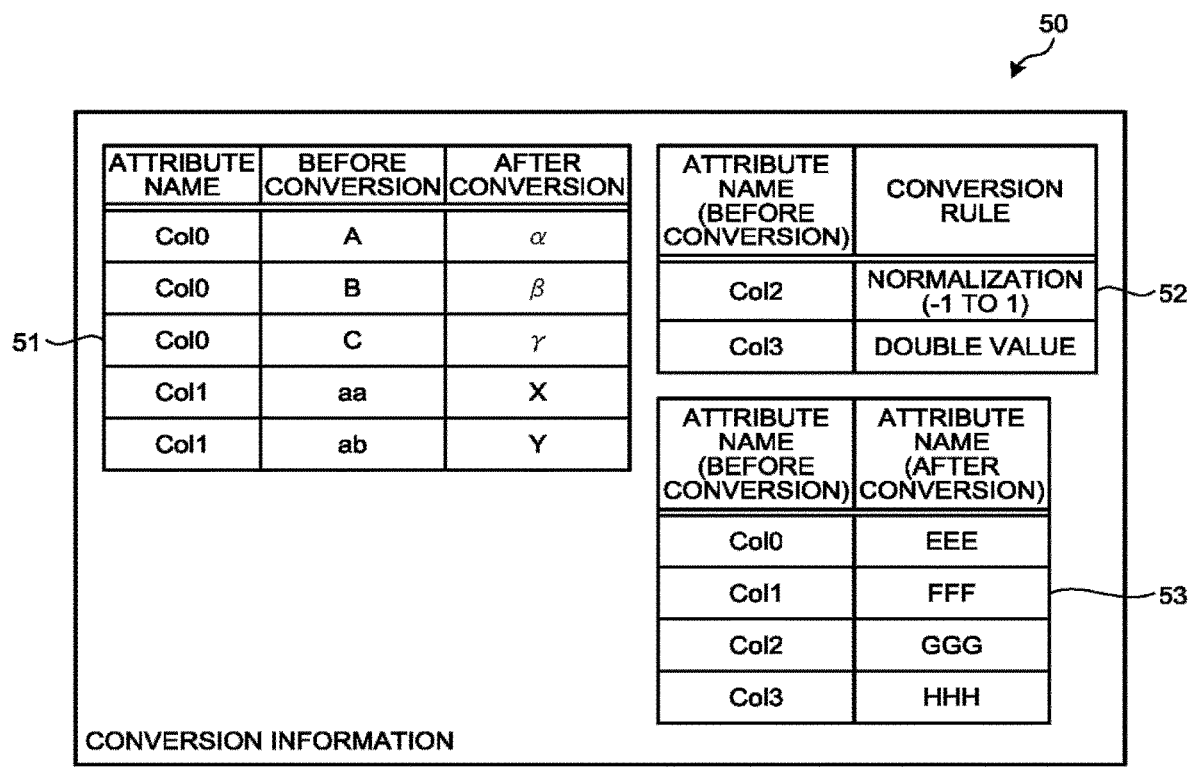
FIG. 16 is a drawing illustrating an example of the conversion information.
Figure 17:
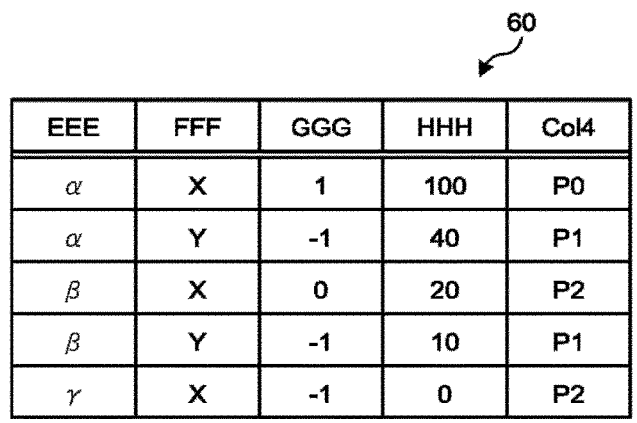
FIG. 17 is a drawing illustrating an example of the concealment record set.
Figure 18:
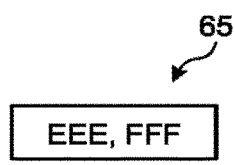
FIG. 18 is a drawing illustrating an example of the concealment record identification information.

Differing from this, the conversion information 50 illustrated in FIG. 16 can be generated based on the conversion setting information 90 illustrated in FIG. 12 and the record set 40 illustrated in FIG. 3. Compared with the conversion information 50 illustrated in FIG. 5, the conversion information 50 illustrated in FIG. 16 differs in a character string after conversion by one-to-one character string conversion. The application of the conversion information 50 illustrated in FIG. 16 to the record set 40 illustrated in FIG. 3 allows generating the concealment record set 60 different from the concealment record set 60 illustrated in FIG. 6 as illustrated in FIG. 17. The application of the conversion information 50 illustrated in FIG. 16 to the record identification information 45 illustrated in FIG. 4 allows generating the concealment record identification information 65 different from the concealment record identification information 65 illustrated in FIG. 7 as illustrated in FIG. 18.

The generation of the plurality pieces of conversion information 50 based on the plurality pieces of conversion setting information 90 and the one record set 40 and the individual application of the plurality pieces of conversion information 50 to the one record set 40 and the record identification information 45 allow generating the plurality of concealment record sets 60 and the concealment record identification information 65.

Figure 19:
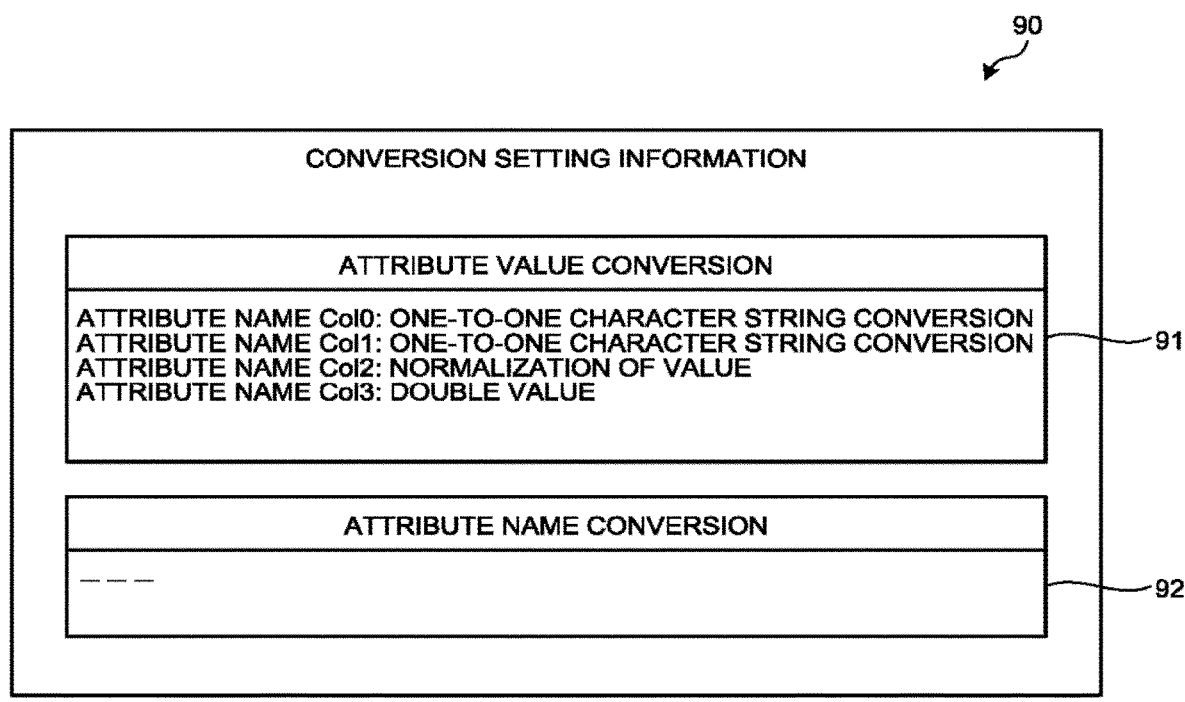
FIG. 19 is a drawing illustrating an example of the conversion setting information.

Giving a specific example, for example, assume that the record set 40 illustrated in FIG. 3 and the record identification information 45 illustrated in FIG. 4 are acquired, and the conversion setting information 90 illustrated in FIG. 19 is acquired in addition to the conversion setting information 90 illustrated in FIG. 12. While the attribute value conversion rule 91 applied to the conversion of the attribute value in the conversion setting information 90 illustrated in FIG. 19 is similar to that of the conversion setting information 90 illustrated in FIG. 12, the attribute name conversion rule 92 applied to the conversion of the attribute name is blank, that is, setting that the attribute name is not converted.

In this case, as described in the above-described embodiment, the conversion information 50 illustrated in FIG. 5 is generated based on the conversion setting information 90 illustrated in FIG. 12 and the record set 40 illustrated in FIG. 3. The application of the conversion information 50 illustrated in FIG. 5 to the record set 40 illustrated in FIG. 3 generates the concealment record set 60 illustrated in FIG. 6 and the application of the conversion information 50 illustrated in FIG. 5 to the record identification information 45 illustrated in FIG. 4 generates the concealment record identification information 65 illustrated in FIG. 7.

Differing from this, the conversion information 50 illustrated in FIG. 20 is generated based on the conversion setting information 90 illustrated in FIG. 19 and the record set 40 illustrated in FIG. 3. Compared with the conversion information 50 illustrated in FIG. 5, the conversion information 50 illustrated in FIG. 20 differs in that the attribute name conversion table 53 is not included. The application of the conversion information 50 illustrated in FIG. 20 to the record set 40 illustrated in FIG. 3 allows generating the concealment record set 60 different from the concealment record set 60 illustrated in FIG. 6 as illustrated in FIG. 21. Since the conversion information 50 illustrated in FIG. 20 does not include the attribute name conversion table 53, copying the record identification information 45 illustrated in FIG. 4 as it is allows generating the concealment record identification information 65 illustrated in FIG. 22.

The generation of the one conversion information 50 based on one piece of the conversion setting information 90 and the plurality of record sets 40 and the application of the common conversion information 50 to the plurality of record sets 40 and the record identification information 45 allow generating the plurality of concealment record sets 60 and the concealment record identification information 65. For example, the conversion information 50 generated based on one piece of the conversion setting information 90 and the one record set 40 is stored. When another record set 40 is acquired, the conversion information 50 fitting to the other record set 40 most is selected from the stored conversion information 50, and this conversion information 50 is updated based on the other record set 40. This allows applying the common conversion information 50 to the plurality of record sets 40 and the record identification information 45 and generating the plurality of concealment record sets 60 and the concealment record identification information 65.

Giving a specific example, for example, assume that the conversion information managing unit 33 stores the conversion information 50 illustrated in FIG. 5 generated based on the conversion setting information 90 illustrated in FIG. 12 and the record set 40 illustrated in FIG. 3. Additionally, assume that the record set 40 illustrated in FIG. 23 is acquired as the new record set 40. At this time, the conversion information 50 illustrated in FIG. 5 is read from the conversion information managing unit 33 and this conversion information 50 is updated based on the record set 40 illustrated in FIG. 23 to generate the conversion information 50 illustrated in FIG. 24. In the conversion information 50 illustrated in FIG. 24, the parts where the diagonal lines are drawn in the first attribute value conversion table 51 are parts updated based on the record set 40 illustrated in FIG. 23.

This conversion information 50 illustrated in FIG. 23 is the conversion information 50 applicable common to both the record set 40 illustrated in FIG. 3 and the record set 40 illustrated in FIG. 23. Accordingly, using this common conversion information 50, the plurality of concealment record sets 60 can be generated from the plurality of record sets 40.

Supplemental Description

The first information processing apparatus 10 (10') and the second information processing apparatus 20 described in the above-described embodiments can be achieved by, for example, collaboration of hardware constituting a general computer and a program (software) executed by the computer. That is, the functions of the respective units of the first information processing apparatus 10 (10') and the second information processing apparatus 20 described in the above-described embodiments can be achieved by execution of a predetermined program by the computer.

Figures 24, 25:
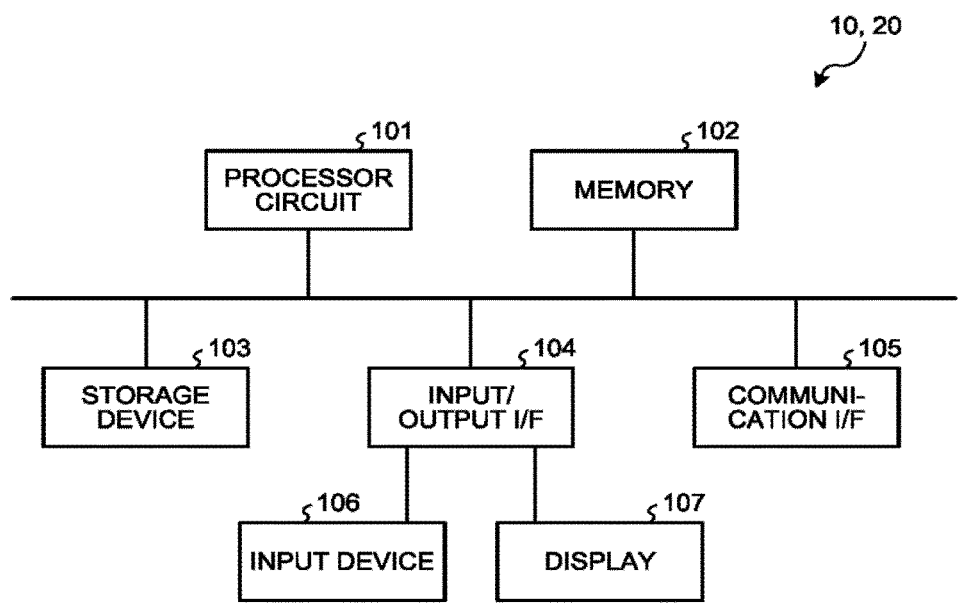
FIG. 24 is a drawing illustrating an example of the conversion information.
FIG. 25 is a block diagram illustrating an example of hardware configuration of a first information processing apparatus and a second information processing apparatus.

FIG. 25 is a block diagram illustrating an example of a hardware configuration of the first information processing apparatus 10 (10') and the second information processing apparatus 20. For example, as illustrated in FIG. 25, these first information processing apparatus 10 (10') and second information processing apparatus 20 can employ a hardware configuration as a general computer (computer system) that includes a processor circuit 101 such as a Central Processing Unit (CPU) and a Graphics Processing Unit (GPU), a memory 102 such as a Random Access Memory (RAM) and a ROM, a storage device 103 such as a Hard Disk Drive (HDD) and a Solid State Drive (SDD), an input/output I/F 104 for coupling of peripheral devices such as an input device 106 and a display 107, and a communication I/F 105 for communications with an external device.

The respective units of the first information processing apparatus 10 (10'), that is, the functions of the record set acquiring unit 11, the record identification information acquiring unit 12, the conversion information acquiring unit 13, the concealing unit 14, the first transmitter 15, the first receiver 16, the concealment canceling unit 17, the output unit 18, the conversion setting information acquiring unit 31, the conversion information generating unit 32, and the conversion information managing unit 33, for example, can be achieved by reading the programs stored in the storage device 103 or the like by the processor circuit 101 and executing the programs using the memory 102.

The respective units of the second information processing apparatus 20, that is, the functions of the second receiver 21, the data analyzer 22, and the second transmitter 23 can be achieved by, for example, reading the programs stored in the storage device 103 or the like by the processor circuit 101 and executing the programs using the memory 102.

The programs to achieve the functions of the respective units of the first information processing apparatus 10 (10') and the programs to achieve the functions of the respective units of the second information processing apparatus 20 can be provided by, for example, storing the program in another computer coupled to a network such as the Internet and downloading the program over the network. The program may be provided or distributed over the network such as the Internet. The program may be stored in a computer-readable recording medium to be provided.

A part of or all of the respective units of the first information processing apparatus 10 (10') and the respective units of the second information processing apparatus 20 may have a configuration achieved by dedicated hardware such as an Application Specific Integrated Circuit (ASIC) and a Field-Programmable Gate Array (FPGA). The respective units of the first information processing apparatus 10 (10') and the respective units of the second information processing apparatus 20 may have a configuration achieved by being dispersed into a plurality of computers.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing system comprising:

a first information processing apparatus coupled to a network; and a second information processing apparatus coupled to a network, wherein the first information processing apparatus comprises:

a record set acquiring unit configured to acquire a record set, the record set being a set of records having a plurality of data elements as pairs of attribute names and attribute values;

a record identification information acquiring unit configured to acquire record identification information, the record identification information being information for uniquely identifying each record included in the record set, the record identification information indicating at least one of the attribute names;

a concealing unit configured to convert at least one of an attribute name and an attribute value of a data element designated with conversion information among the plurality of data elements held by at least one record included in the record set, in accordance with the conversion information including at least a conversion rule applied to the at least one of the attribute name and the attribute value designated for conversion, to generate a concealment record set, and generate concealment record identification information for uniquely identifying each record included in the concealment record set based on the record identification information and the conversion information; and a first transmitter configured to transmit the concealment record set and the concealment record identification information to the second information processing apparatus via the network, and the second information processing apparatus comprises:

a second receiver configured to receive the concealment record set and the concealment record identification information from the first information processing apparatus via the network; and a data analyzer configured to analyze, by using a learning model or a numerical model, each record included in the concealment record set and identified based on the concealment record identification information.

2. The information processing system according to claim 1,
wherein
the second information processing apparatus further comprises
a second transmitter configured to transmit an analysis result by the data analyzer to the first information processing apparatus, and
the first information processing apparatus further comprises:
a first receiver configured to receive the analysis result from the second information processing apparatus;
a concealment canceling unit configured to perform an inverse transformation on the analysis result based on the conversion information to generate a concealment cancellation analysis result; and
an output unit configured to output the concealment cancellation analysis result.

3. The information processing system according to claim 2,
wherein the first information processing apparatus further comprises
a conversion information managing unit configured to hold a correspondence table in which first identification information and second identification information are associated each other, the first identification information identifying the concealment record set, the second identification information identifying the conversion information used to generate the concealment record set, and
the concealment canceling unit is configured to identify the conversion information used for performing the inverse transformation on the analysis result based on the first identification information of the concealment record set corresponding to the analysis result and the correspondence table.

4. The information processing system according to claim 1, wherein the first information processing apparatus further comprises
a conversion information acquiring unit configured to acquire the conversion information.

5. The information processing system according to claim 1, wherein the first information processing apparatus further comprises:
a conversion setting information acquiring unit configured to acquire conversion setting information, the conversion setting information designating a conversion rule applied to an attribute name or an attribute value that is a target for conversion; and
a conversion information generating unit configured to generate the conversion information based on the conversion setting information and the record set.

6. The information processing system according to claim 5, wherein
the conversion information generating unit is configured to generate a plurality pieces of the conversion information based on one piece of the conversion setting information and one record set, and
the concealing unit is configured to generate a plurality of concealment record sets from one record set using a plurality pieces of the conversion information.

7. The information processing system according to claim 5,
wherein
the conversion information generating unit is configured to generate one piece of the conversion information based on one piece of the conversion setting information and a plurality of record sets, and
the concealing unit is configured to generate a plurality of concealment record sets from the plurality of record sets using one piece of the conversion information.

8. An information processing apparatus coupled to a network, the information processing apparatus comprising:
a record set acquiring unit configured to acquire a record set, the record set being a set of records having a plurality of data elements as pairs of attribute names and attribute values;
a record identification information acquiring unit configured to acquire record identification information, the record identification information being information for uniquely identifying each record included in the record set, the record identification information indicating at least one of the attribute names;
a concealing unit configured to
convert at least one of an attribute name and an attribute value of a data element designated with conversion information among the plurality of data elements held by at least one record included in the record set, in accordance with the conversion information including at least a conversion rule applied to the at least one of the attribute name and the attribute value designated for conversion, to generate a concealment record set, and
generate concealment record identification information for uniquely identifying each record included in the concealment record set based on the record identification information and the conversion information;
a transmitter configured to transmit the concealment record set and e concealment record identification information to an external device via the network;
a receiver configured to receive an analysis result from the external device via the network, the analysis result being acquired by analyzing, in the external device, each record included in the concealment record set and identified based on the concealment record identification information, the analyzing being performed using a learning model or a numerical model;
a concealment canceling unit configured to perform an inverse transformation on the analysis result based on the conversion information to generate a concealment cancellation analysis result; and
an output unit configured to output the concealment cancellation analysis result.

9. An information processing method performed by an information processing system including a first information processing apparatus coupled to a network and a second information processing apparatus coupled to the network, the information processing method comprising:
acquiring a record set by a record set acquiring unit in the first information processing apparatus, the record set being a set of records having a plurality of data elements as pairs of attribute names and attribute values;
acquiring record identification information by a record identification information acquiring unit in the first information processing apparatus, the record identification information being information for uniquely identifying each record included in the record set, the record identification information indicating at least one of the attribute names;
converting at least one of an attribute name and an attribute value of a data element designated with conversion information by a concealing unit in the first information processing apparatus, among the plurality of data elements held by at least one record included in the record set, in accordance with the conversion information including at least a conversion rule applied to the at least one of the attribute name and the attribute value designated for the converting, to generate a concealment record set and generating concealment record identification information for uniquely identifying each record included in the concealment record set based on the record identification information and the conversion information;

transmitting the concealment record set and the concealment record identification information to the second information processing apparatus via the network by a transmitter in the first information processing apparatus;

receiving the concealment record set and the concealment record identification information from the first information processing apparatus via the network by a receiver in the second information processing apparatus; and analyzing, by using a learning model or a numerical model, by a data analyzer in the second information processing apparatus, each record included in the concealment record set and identified based on the concealment record identification information.

10. A computer program product having a computer readable medium including instructions, wherein the instructions, when executed by a computer coupled to a network, cause the computer to perform:

acquiring a record set, the record set being a set of records having a plurality of data elements as pairs of attribute names and attribute values;

acquiring record identification information, the record identification information being information for uniquely identifying each record included in the record set, the record identification information indicating at least one of the attribute names;

converting at least one of an attribute name and an attribute value of a data element designated with conversion information among the plurality of data elements held by at least one record included in the record set, in accordance with the conversion information including at least a conversion rule applied to the at least one of the attribute name and the attribute value designated for the converting, to generate a concealment set, and generating concealment record identification information for uniquely identifying each record included in the concealment record set based on the record identification information and the conversion information;

transmitting the concealment record set and the concealment record identification information to an external device via the network;

receiving an analysis result from the external device via the network, the analysis result being acquired by analyzing, in the external device, each record included in the concealment record set and identified based on the concealment record identification information, the analyzing being performed using a learning model or a numerical model;

performing an inverse transformation on the analysis result based on the conversion information to generate a concealment cancellation analysis result; and outputting the concealment cancellation analysis result.

* * * * *